Figure 1:
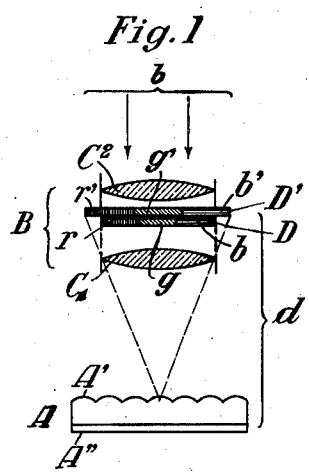

April 3, 1934.   G. HEYMER   1,953,176
APPARATUS FOR PROJECTING LENTICULAR SCREEN FILMS
Filed May 13, 1930

Inventor:
Gerd Heymer,
By Philip S. Hopkins,
Attorney.

Patented Apr. 3, 1934

1,953,176

UNITED STATES PATENT OFFICE 1,953,176

APPARATUS FOR PROJECTING LENTICULAR SCREEN FILMS

Gerd Heymer, Dessau-Ziebigk in Anhalt, Germany, assignor to Agfa Ansco Corporation, Binghamton, N. Y., a corporation of New York Application May 13, 1930, Serial No. 452,053
In Germany May 15, 1929

2 Claims. (Cl. 88—16.4)

My present invention relates to apparatus for projecting lenticular screen films in colors and more particularly to such an apparatus in which the size of the picture is regulated by a lens or a lens system added to the objective which has served for the exposure of the original.

The projection in colors of lenticular screen films prepared according to the process of Rodolphe Berthon, (see U. S. patent specification No. 992,151) is effected in the simplest manner by exposing the lenticular screen film to light with the film side nearest to the objective which has served for taking the original and which at its optical center is provided with a color screen. The exact projection of the actual colors is ensured in this process by the fact that during the projection the distance of the objective and the color screen, respectively, from the film is exactly the same as in taking the pictures. If, however, the projection of cinematographic lenticular screen films is effected according to the said process, the picture produced will be too large for the reason that the optical system of a motion picture apparatus has a very short focal length, whereas the optical system of cinematograph projectors has a very long one.

According to my invention, the size of the projected picture is regulated by placing a supplementary light-collecting lens or lens system of suitable focal length in front of the picture-taking objective used for projection. Such a lens or lens system refracts the beams emanating from the objective in the direction of the optical axis and thus reduces the size of the picture, whilst the light intensity is at the same time considerably increased. This operation amounts in principle to a prolongation of the focal length of the projection objective.

When using an optical system of the kind above described for projection it is advantageous to adjust the objective in such a manner that the film is placed in the rear focal plane, whereas the projected picture is brought into sharp focus only by the adjustment of the auxiliary lens placed in front of the objective.

Projection according to the present invention may also be effected by means of an optical system in which only the optical part between the film and the color screen corresponds to the corresponding optical part of the objective which has served for the exposure. This invention may also be carried out by also replacing the optical rear part of the objective between the color screen and the film by another optical system which must be similar only in effect to that optical part of the objective which lies between the film and the color screen as regards the size and the position of the screen picture. The desired size of picture is obtained, also in this case, by the adjustment of the front part of the objective, the condition of which is, however, of no consequence at all for the exact reproduction of the actual colors in the same way as the front part of the objective in front of the color screen has no influence upon the production of the exact colors when taking the original.

Figure 2:
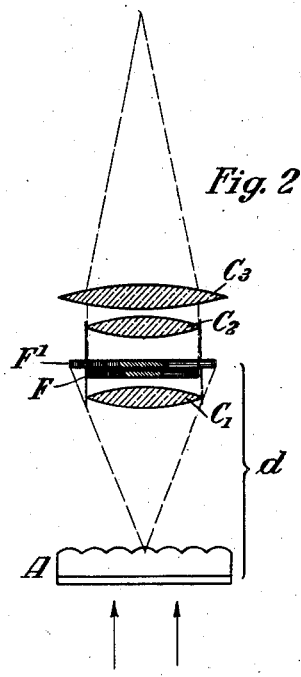
Figure 3:
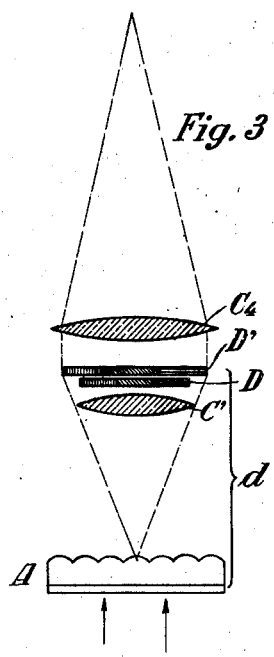
Figure 4:
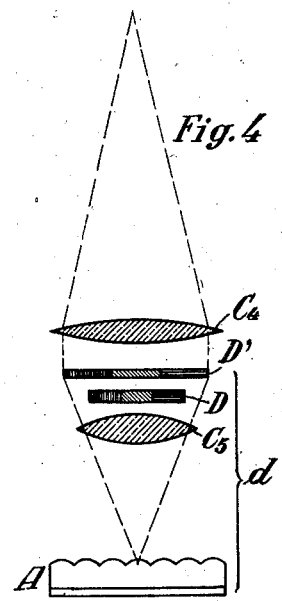

My invention will become more intelligible by the following considerations, reference being made to the accompanying drawing, in which Fig. 1 shows the optical system used in exposing the original and Figs. 2 to 4 show diagrammatically some embodiments of my invention, the same reference characters being used throughout the different figures to indicate the same or corresponding elements. The way of the incident light rays is indicated by arrows.

In Fig. 1 representing the optical elements and their coacting function during the exposure of the original, A is the lenticuar screen film facing with its optical elements A' the objective B which serves to illuminate the light sensitive layer A'' of the film. $C_1$ indicates diagrammatically that part of the objective B placed between the color filter D and the lenticular screen film A, and $C_2$, likewise, indicates the optical elements between the said color filter D and the object to be taken. The color filter D comprises a diaphragm with three apertures respectively covered by suitably selected red, green and blue screens and is placed at the center of the objective B. By the rear part $C_1$ of the objective B a virtual image of the color screen D is produced situated when viewed from the side of the lenticular screen film at D'. The position of this virtual image D' is decisive for the position of the infinitely small images of the three color screen produced by the lenticular elements A' of the film and recorded in its light sensitive emulsion A''. In Fig. 1 the distance of the virtual image D' from the lenticular screen film A is indicated with $e$, its breadth with $b'$. When projecting the exact colors of the original, it is necessary that the virtual image of the color screen D reproduced by the lens elements $C_1$ is identical with respect to the distance $d$ and the breadth $b$ with that virtual image occurring while exposed. The simplest process to maintain this condition, obviously, consists in projecting the picture by means of the objective which has served for producing the impressions on the light sensitive emulsion of the lenticular screen film. However, under these conditions the picture would be projected at a distance too far from the film while, on the other hand, a displacement of the objective to produce the projected picture nearer to the film, would alter the position of the virtual image.

Therefore, I prefer to place the objective with which the original was exposed in focal length before the lenticular screen film and to collect the light beams emanating from the objective nearly parallelly by an additional lens or lens system $C_3$. This is seen in Fig. 2.

From these considerations it may be made clear that for the reproduction in the exact colors it is only necessary to preserve the optical relations between the color screen D and the optical part $C_1$ of the objective B facing the lenticular film A. Therefore, another embodiment of my invention consists in uniting the lenses $C_2$ and $C_3$ (see Fig. 2) to form a single lens or system of lenses $C_4$ without altering the position of the virtual image D'. This optical arrangement is shown in Fig. 3.

Finally, the lens $C_1$ positioned between the filter D and the lenticular screen film A may be substituted by another lens or system of lenses $C_5$ (see Fig. 4), care being taken, however, that by this substitution neither the distance D of the virtual image $D^x$ from the lenticular screen film A nor the breadth $b$ of the virtual image D' is altered. Thus, for instance, I may insert a greater lens or system of lenses $C_5$ without altering the focal length of the rear part $C_1$ of the objective B. Or, I may insert a lens or system of lenses of greater focal length. In this case, however, the position of the filter screen D is to be altered, so that the virtual image projected by the new system of lenses $C_5$ is identical with respect to the distance from the film A and to its breadth with that of the former virtual image.

What I claim is:—

1. In an apparatus for projecting lenticular films, in combination, a lenticular film, a projection objective comprising a front part and a rear part arranged at focal distance in front of said lenticular film and facing the lenticular elements, and a multi-color filter inserted between said front part and said rear part of said objective, said rear part and said multi-color filter being so adjusted to produce a virtual image of said multi-color filter in dimensions and at a distance from the lenticular film equal to the dimensions and the distance from the lenticular film of the multi-color filter or its virtual image in taking, and said front part and said rear part co-operating so that said projection objective has a focal length substantially greater than that of the taking objective.

2. In an apparatus for projecting lenticular films, in combination, a lenticular film, a projection objective identical with the objective used for taking, a multi-color filter having the size of the multi-color filter used in taking arranged at the same place with relation to said objective as was the multi-color filter in taking, and a light collecting system arranged in front of said projection objective and co-operating with said objective so that the projection objective has a focal length substantially greater than that of the taking objective.

GERD HEYMER.